(12) United States Patent
Stark et al.

(10) Patent No.: US 12,338,858 B2
(45) Date of Patent: Jun. 24, 2025

(54) BRAKE ASSEMBLY WITH ASYMMETRICAL SHOULDER BEARING

(71) Applicant: HL MANDO CORPORATION, Gyeonggi-do (KR)

(72) Inventors: Connor Stark, Bay City, MI (US); Troy Strieter, Bay City, MI (US)

(73) Assignee: HL MANDO CORPORATION, Gyeonggi-do (KR)

( * ) Notice: Subject to any disclaimer, the term of this patent is extended or adjusted under 35 U.S.C. 154(b) by 66 days.

(21) Appl. No.: 18/142,436

(22) Filed: May 2, 2023

(65) Prior Publication Data
US 2024/0369105 A1   Nov. 7, 2024

(51) Int. Cl.
*F16C 19/16* (2006.01)
*F16C 33/58* (2006.01)

(52) U.S. Cl.
CPC .......... *F16C 33/581* (2013.01); *F16C 19/163* (2013.01); *F16C 33/585* (2013.01); *F16C 2361/45* (2013.01)

(58) Field of Classification Search
CPC .... F16C 19/163; F16C 19/166; F16C 33/381; F16C 33/585; F16C 2361/45; F16D 2023/12; F16D 2125/40; F16D 65/18; F16H 25/2204
See application file for complete search history.

(56) References Cited

U.S. PATENT DOCUMENTS

| 6,325,180 | B1 * | 12/2001 | De Vries | F16C 33/60 188/162 |
| 6,527,448 | B1 * | 3/2003 | Gurka | F16C 33/61 384/515 |
| 6,763,918 | B1 * | 7/2004 | Kapaan | F16D 65/18 188/71.9 |
| 2016/0312823 | A1 * | 10/2016 | De Rooster | F16C 33/585 |

FOREIGN PATENT DOCUMENTS

| CN | 114645905 A * | 6/2022 |
| JP | 11-260295 | 9/1999 |
| KR | 2001-0021586 | 3/2001 |
| KR | 2001-0021587 | 3/2001 |
| KR | 10-2016-0003085 | 1/2016 |
| KR | 10-2021-0043581 | 4/2021 |

* cited by examiner

*Primary Examiner* — Phillip A Johnson
(74) *Attorney, Agent, or Firm* — WOMBLE BOND DICKINSON (US) LLP

(57) ABSTRACT

A brake assembly comprises: a rotatable part configured to be rotatable by an actuator; a translatable part operably coupled with the rotatable part, and configured to be axially translatable relative to the rotatable part to move a brake pad according to rotation of the rotatable part; and a bearing assembly comprising: an inner race provided on an outside of the rotatable part, the inner race having first and second inner shoulders and an inner curved surface; an outer race having first and second outer shoulders and an outer curved surface; and rollable bodies movably disposed between the inner race and the outer race. The first inner shoulder of the (Continued)

inner race and/or the first outer shoulder of the outer race are asymmetric to the second inner shoulder of the inner race and/or the second outer shoulder of the outer race, respectively.

9 Claims, 8 Drawing Sheets

BRAKE ASSEMBLY WITH ASYMMETRICAL SHOULDER BEARING

BACKGROUND

Various embodiments of the present disclosure generally relate to brake assemblies for a vehicle and more particularly to a brake assembly having a bearing assembly with asymmetrical race shoulders.

An electro-mechanical brake (EMB) is a brake assembly that is actuated by electrical energy. For example, the EMB system generally provides braking of a vehicle by the use of a motor which becomes selectively energized in response to a signal of an electronic control unit (ECU) or a sensed depression of a brake input means. Generally, the EMB system may include a rotor, a brake caliper, and brake pads on opposing sides of the rotor. The brake caliper is slidably supported on pins secured to an anchor bracket fixed to a non-rotatable component of the vehicle, and includes one or more piston bores, each of which houses a piston that is movable along a piston axis during a brake apply and release of the brake apply. The brake pads are connected to one or more electrically actuated pistons for movement between a non-braking position and a braking position where the brake pads are moved into frictional engagement with the opposed braking surfaces of the rotor. For example, when an operator of the vehicle depresses a brake pedal, an actuator can move the piston into contact with one brake pad and then move one brake pad into contact with one side of the rotor, while another opposing brake pad is moved into contact with an opposing side of the rotor.

By way of example and without limitation, such an EMB system provides the desired braking in a substantially shorter amount of time than that which is provided by a conventional hydraulic braking system and allows each of the individual wheels of a vehicle or other selectively movable assembly to be selectively controlled, thereby enhancing the effectiveness of many operating strategies such as an anti-skid or anti-lock braking strategy or a strategy which is commonly referred to as an integrated vehicular dynamic strategy.

It is with respect to these and other general considerations that the following embodiments have been described. Also, although relatively specific problems have been discussed, it should be understood that the embodiments should not be limited to solving the specific problems identified in the background.

SUMMARY

The features and advantages of the present disclosure will be more readily understood and apparent from the following detailed description, which should be read in conjunction with the accompanying drawings, and from the claims which are appended to the end of the detailed description.

According to various embodiments of the present disclosure, a brake assembly may comprise: a rotatable part configured to be rotatable by an actuator; a translatable part operably coupled with the rotatable part, the translatable part configured to be axially translatable relative to the rotatable part to move a brake pad according to rotation of the rotatable part, and a bearing assembly comprising: an inner race provided on an outside of the rotatable part, the inner race having a first inner shoulder, a second inner shoulder, and an inner curved surface between the first inner shoulder and the second inner shoulder, an outer race having a first outer shoulder, a second outer shoulder, and an outer curved surface between the first outer shoulder and the second outer shoulder, and rollable bodies rollably disposed between the inner race and the outer race, wherein the first inner shoulder of the inner race and/or the first outer shoulder of the outer race are asymmetric to the second inner shoulder of the inner race and/or the second outer shoulder of the outer race, respectively.

The first inner shoulder of the inner race may be more outwardly protruded than the second inner shoulder of the inner race. For example, the first inner shoulder of the inner race positioned to be closer to the brake pad than the second inner shoulder of the inner race is more outwardly protruded than the second inner shoulder of the inner race positioned to be farther from the brake pad than the first inner shoulder of the inner race.

The second outer shoulder of the outer race may be more inwardly protruded than the first outer shoulder of the outer race. For instance, the second outer shoulder of the outer race positioned to be farther from the brake pad than the first outer shoulder of the outer race is more inwardly protruded than the first outer shoulder of the outer race positioned to be closer to the brake pad than the second outer shoulder of the outer race.

According to first exemplary embodiments of the present disclosure, the first inner shoulder of the inner race positioned to be closer to the brake pad than the second inner shoulder of the inner race is more outwardly protruded than the second inner shoulder of the inner race positioned to be farther from the brake pad than the first inner shoulder of the inner race, and the second outer shoulder of the outer race positioned to be farther from the brake pad than the first outer shoulder of the outer race is more inwardly protruded than the first outer shoulder of the outer race positioned to be closer to the brake pad than the second outer shoulder of the outer race.

According to second exemplary embodiments of the present disclosure, the first inner shoulder of the inner race positioned to be closer to the brake pad than the second inner shoulder of the inner race is more outwardly protruded than the second inner shoulder of the inner race positioned to be farther from the brake pad than the first inner shoulder of the inner race, and the first outer shoulder and the second outer shoulder of the outer race are protruded at a same height as each other.

According to third exemplary embodiments of the present disclosure, the first inner shoulder and the second inner shoulder of the inner race are protruded at a same height as each other, and the second outer shoulder of the outer race positioned to be farther from the brake pad than the first outer shoulder of the outer race is more inwardly protruded than the first outer shoulder of the outer race positioned to be closer to the brake pad than the second outer shoulder of the outer shoulder.

A distance between the first inner shoulder and the first outer shoulder of the bearing assembly which are positioned to be closer to the brake pad than the second inner shoulder and the second outer shoulder of the bearing assembly, respectively, may be greater than a radius of one of the rollable bodies disposed between the inner race and the outer race of the bearing assembly.

A distance between the second inner shoulder and the second outer shoulder of the bearing assembly which are positioned to be farther from the brake pad than the first inner shoulder and the first outer shoulder of the bearing assembly, respectively, may be greater than a radius of one of the rollable bodies disposed between the inner race and the outer race of the bearing assembly.

The inner race of the bearing assembly may be integrally formed on the outside of the rotatable part operatable connected with the translatable part.

The first inner shoulder, the second inner shoulder, and the inner curved surface may be integrally formed with the rotatable part as a single piece.

The first outer shoulder, the second outer shoulder, and the outer curved surface may be integrally formed as a single piece.

The brake assembly may further comprise other rollable bodies disposed between the rotatable part and the translatable part.

This Summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Various embodiments in accordance with the present disclosure will be described with reference to the drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF EMBODIMENTS

In the following detailed description, reference is made to the accompanying drawings which form a part of the present disclosure, and in which are shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the invention. The following detailed description is therefore not to be taken in a limiting sense, and the scope of the invention is defined only by the appended claims and equivalents thereof. Like numbers in the figures refer to like components, which should be apparent from the context of use.

Figure 1:
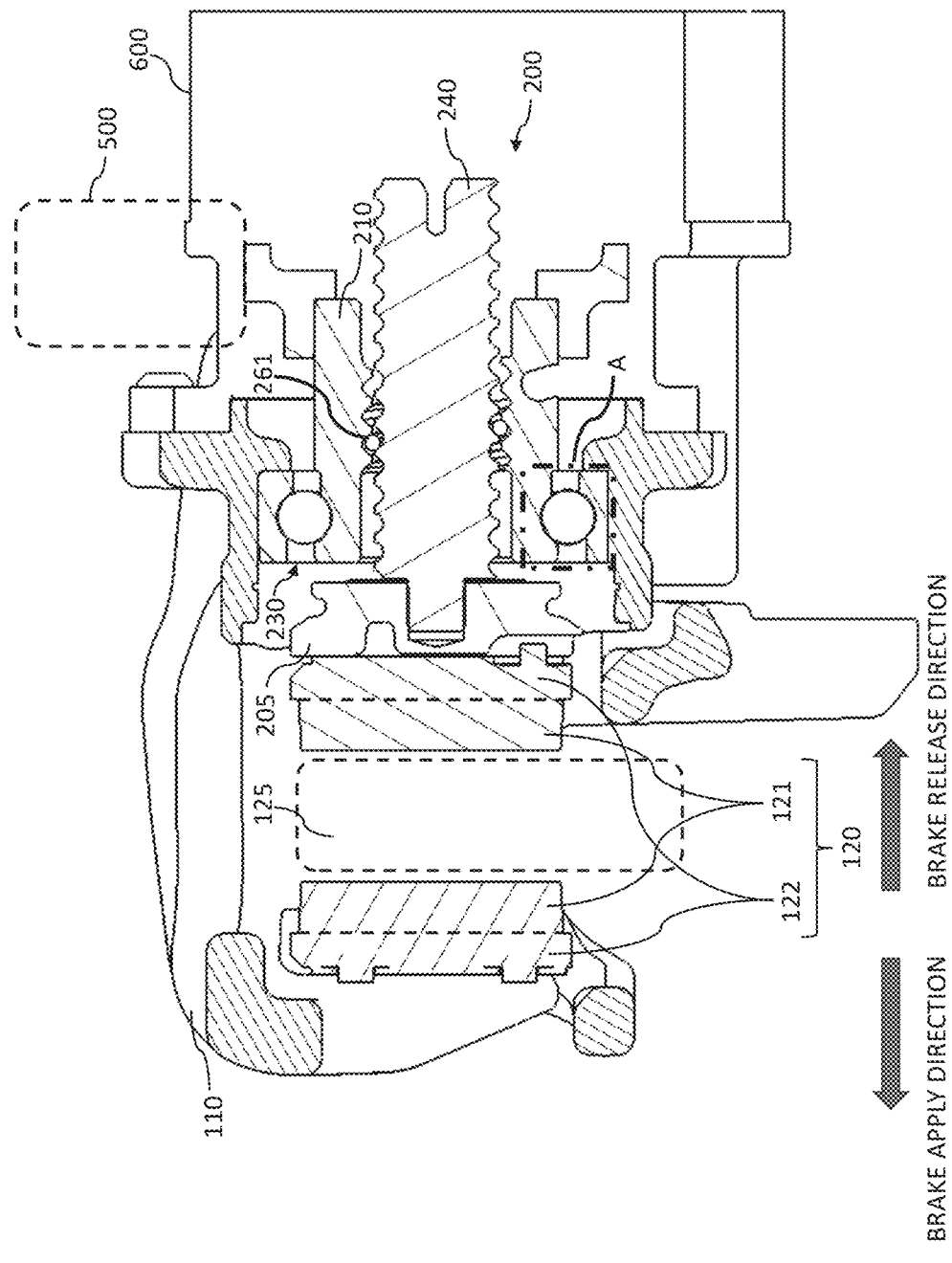
FIG. 1 is a cross-sectional view of a brake assembly according to an exemplary embodiment of the present disclosure.

Referring to FIG. 1, a brake assembly 10 may include a brake caliper 110. The brake caliper 110 may be mounted in a floating manner by means of a brake carrier. The brake caliper 110 may be connected to any non-rotating or non-moving part of a vehicle. When the vehicle is in motion, a brake rotor 125 may rotate with a wheel about an axle of the vehicle. A brake pad assembly (or brake lining assembly) 120 is provided in the brake caliper 110, and includes a brake pad or lining 121 and a brake pad (or lining) carrier 122. The brake caliper 110 may include a bridge with fingers, and the fingers of the brake caliper 110 may be in contact with the brake pad carrier 122. The brake pad 121 is disposed with a small air clearance on a side of the brake rotor 125, such as a brake disc, in a release position so that no significant residual drag moment occurs. The brake pad carrier 122 is disposed between the brake pad 121 and a brake pad footing 205, the brake pad 121 and the brake pad carrier 122 of the brake assembly 120 move jointly together, and the movement of the brake pad carrier 122 causes the brake pad 121 to move with respect to the brake rotor 125.

The brake assembly 10 may comprise a screw mechanism 200 (e.g. a ball screw mechanism or a nut-screw mechanism) configured to convert rotary motion generated by an actuator assembly 500 into linear motion in order to move the brake pad assembly 120 toward or away from the brake rotor 125 in an axial direction.

The screw mechanism 200 may include a rotatable part 210 and a translatable part 240. For example, the rotatable part 210 may comprise a nut or a ball nut and the translatable part 240 may comprise a screw or a ball screw, although not required. The screw mechanism 200 may be contained within a housing 600. The rotatable part 210 and the translatable part 240 may be concentrically mounted in a cavity formed by an inner wall of the housing 600. The housing 600 may be fixedly coupled with the brake caliper 110.

The rotatable part 210 is operably coupled to the actuator assembly 500, and is configured to be rotatable by actuation of the actuator assembly 500. For example, the rotatable part 210 is directly or indirectly coupled to the actuator assembly 500 through one or more gears and/or belts, any other connecting means and combination thereof. The actuator assembly 500 may comprise a motor fixedly mounted in the housing 600 or disposed outside the housing 600. Examples of the actuator assembly 500 and other parts of the brake assembly 10 are provided in U.S. patent application Ser. No.

17/575,628, entitled "BRAKE ASSEMBLY WITH TELESCOPIC MULTIPLE BALL SCREW MECHANISM", filed on Jan. 13, 2022, which is incorporated herein by reference in its entirety.

The actuator assembly 500 rotates the rotatable part 210 of the ball-screw mechanism 200, and then the screw mechanism 200 converts the rotary motion of the rotatable part 210 to the linear motion of the brake pad footing 205 to move the brake pad assembly 120 between its brake apply and release positions. For example, the actuation of the actuator 500 causes the rotatable part 210 to rotate, and the rotation of the rotatable part 210 causes the translatable part 240 to be linearly moved. Specifically, the rotatable part 210 can rotate relative to the housing 600, and the rotation of the rotatable part 210 relative to the housing 600 causes to the translatable part 240 advance or retract axially depending on a direction of rotation of the rotatable part 210. As the rotatable part 210 rotates in an expanding direction, the translatable part 240 linearly translates with respect to the rotatable part 210 and the housing 600 so that the translatable part 240 can translate out from the rotatable part 210 and the housing 600 towards the brake rotor 125. As the rotatable part 210 rotates in a collapsing direction, the translatable part 240 linearly translates with respect to the rotatable part 210 and the housing 600 so that the translatable part 240 can linearly move toward the rotatable part 210 and the housing 600 in a direction away from the brake rotor 125. The brake pad footing 205 is fixedly coupled to the translatable part 240 so that the brake pad footing 205 can be linearly movable together with the translatable part 240. When the screw mechanism 200 is in the expanded state, the brake pad footing 205 pushes the brake pad assembly 120 toward the brake rotor 125. When the ball-screw mechanism 200 is in the collapsed state, the brake pad footing 205 moves away from the brake rotor 125.

While the expanding or collapsing direction depends upon whether the nut or ball nut of the rotatable part 210 and the screw or ball screw of the translatable part 240 are left-handed or right-handed, a specific direction is not critical to some embodiments of the present disclosure, and most embodiments of the present disclosure can work with either.

The rotatable part 210 may have a tubular shape with axially open ends, and the translatable part 240 is received within an inside space of the rotatable part 210. The rotatable part 210 and the translatable part 240 are operably connected to each other such that while the rotatable part 210 rotates, the translatable part 240 is linearly movable relative to the rotatable part 210. In other words, the translatable part 240 is slidable with respect to the rotatable part 210, but the translatable part 240 cannot be rotatable relative to the rotatable part 210, and therefore as the rotatable part 210 rotates, the translatable part 240 is linearly moved. For example, the translatable part 240 has a structure configured to prevent the translatable part 240 from rotating relative to the rotatable part 210 while allowing the translatable part 240 to translate in the axial direction.

At least a part of the translatable part 240 is retained within the rotatable part 210. The rotatable part 210 has an internally-threaded track groove and the translatable part 240 has an externally-threaded track groove for a rollable body arrangement of rollable bodies 261 (e.g. balls). The rollable bodies 261 are disposed between the internally-threaded track groove of the rotatable part 210 and the externally-threaded track groove of the translatable part 240. Ball returns either internally or externally carry the rollable bodies 261 from the end of their path back to the beginning to complete their recirculating track. For example, a return tube 236 of FIGS. 2A and 3A can perform recirculation of the rollable bodies 261. The internally-threaded track groove of the rotatable part 210 and the externally-threaded track groove of the translatable part 240 form a series of ball tracks to provide a helical raceway for reception of a train of recirculating the rollable bodies 261. The rollable bodies 261 may be metal spheres which decrease friction and transfer loads between adjacent components. The rotatable part 210 is rotatably supported by the translatable part 240 via the rollable bodies 261 and a bearing assembly 230. However, in alternative embodiments of the present disclosure, the rotatable part 210 and the translatable part 240 can be directly engaged with each other without the rollable bodies 261.

Figure 2C:
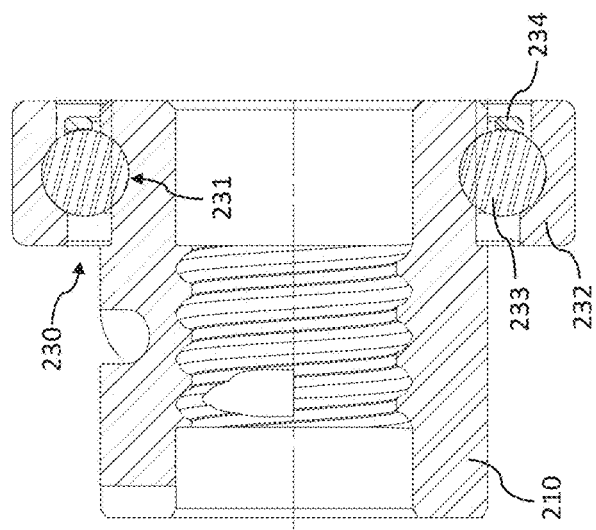
FIG. 2C shows a cross-sectional view cut along line B-B of FIG. 2B according to an embodiment of the present disclosure.
Figure 2B:
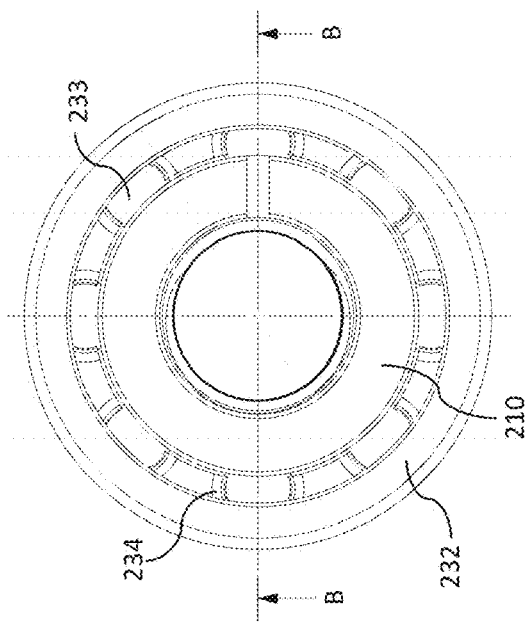
FIG. 2B shows a front view of a bearing assembly and a rotatable part coupled together according to an embodiment of the present disclosure.
Figure 2A:
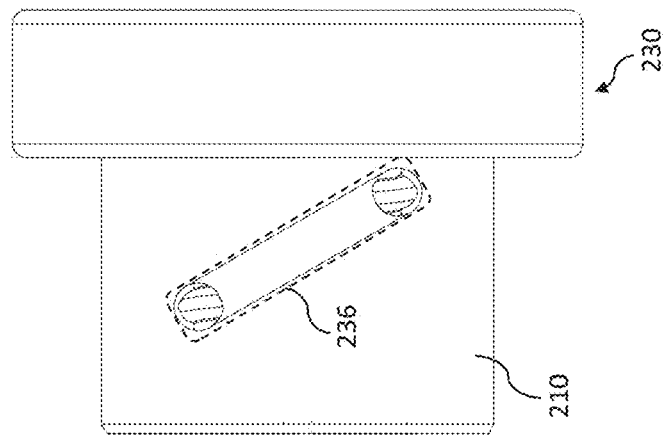
FIG. 2A shows a side view of a bearing assembly and a rotatable part coupled together according to an embodiment of the present disclosure.
Figure 3C:
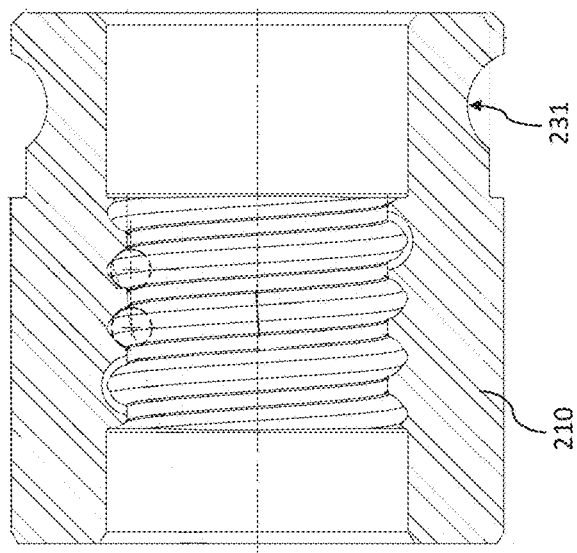
FIG. 3C shows a cross-sectional view cut along line C-C of FIG. 3B according to an embodiment of the present disclosure.
Figure 3B:
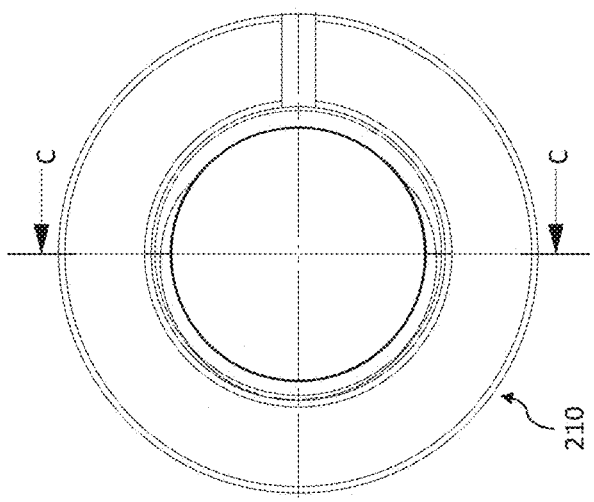
FIG. 3B shows a front view of a rotatable part of a screw mechanism having an inner race of a bearing assembly according to an embodiment of the present disclosure.
Figure 3A:
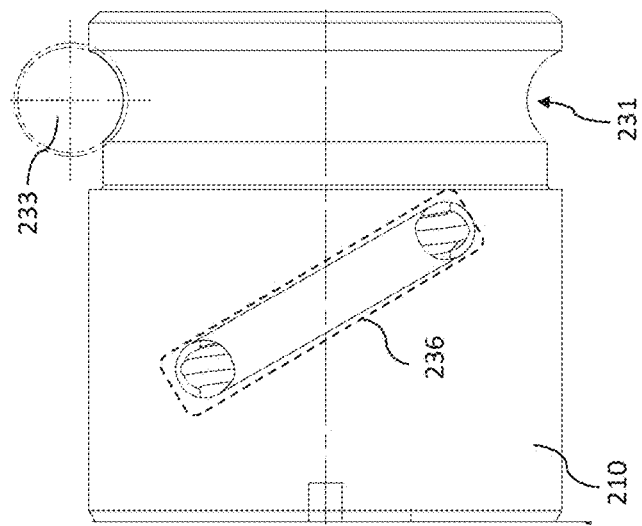
FIG. 3A shows a side view of a rotatable part of a screw mechanism having an inner race of a bearing assembly according to an embodiment of the present disclosure.
Figure 4B:
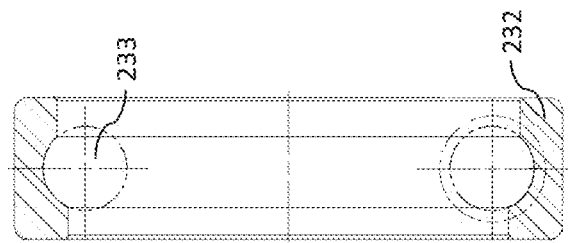
FIG. 4B shows a cross-sectional view cut along line D-D of FIG. 4A according to an embodiment of the present disclosure.
Figure 4A:
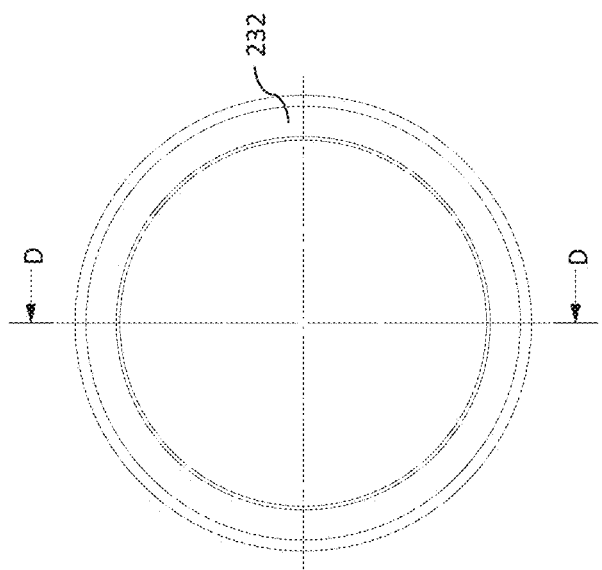
FIG. 4A shows a front view of an outer race of a bearing assembly according to an embodiment of the present disclosure.

The bearing assembly 230 is configured to rotatably support the screw mechanism 200. The bearing assembly 230 may be positioned between the rotatable part 210 of the screw mechanism 200 and a non-rotating structure, for example, but not limited to, the housing 600. The bearing assembly 230 is used to rotatably support the rotatable part 210 for rotation relative to a non-rotating structure of the brake assembly 10. FIG. 2A shows a side view of the bearing assembly 230 and the rotatable part 210 coupled together according to an embodiment of the present disclosure, FIG. 2B shows a front view of the bearing assembly 230 and the rotatable part 210 coupled together according to an embodiment of the present disclosure, and FIG. 2C shows a cross-sectional view cut along line B-B of FIG. 2B according to an embodiment of the present disclosure. FIG. 3A shows a side view of the rotatable part 210 having an inner race of the bearing assembly 230 according to an embodiment of the present disclosure, FIG. 3B shows a front view of the rotatable part 210 having an inner race of the bearing assembly 230 according to an embodiment of the present disclosure, and FIG. 3C shows a cross-sectional view cut along line C-C of FIG. 3B according to an embodiment of the present disclosure. FIG. 4A shows a front view of an outer race of the bearing assembly 230 according to an embodiment of the present disclosure, and FIG. 4B shows a cross-sectional view cut along line D-D of FIG. 4A according to an embodiment of the present disclosure.

The bearing assembly 230 may have an inner race 231, an outer race (or an outer ring) 232, a plurality of rollable bodies 233 (e.g., bearing balls), and a bearing cage 234. The bearing assembly 230 may include any number of rollable bodies 233, for example, more than four balls. The outer race 232 may be located concentrically about the inner race 231, with the rollable bodies 233 therebetween, in a plane generally perpendicular to a rotatable axis of the rotatable part 210 or the inner race 231 or a translatable axis of the translatable part 240. The inner race 231 is rotatable, but the outer race 232 is substantially non-rotatable.

The rollable bodies 233 is configured to aid in rotation of the inner race 231 included in the translatable part 240 relative to the outer race (or the outer ring) 232. The rollable bodies 233 are disposed in an annular cavity defined by the inner race 231 and the outer race 232, between the inner race 231 and the outer race 232. The rollable bodies 233 are supported within the bearing cage 234 such that the rollable bodies 233 are appropriately circumferentially spaced and retained by the bearing cage 234. The bearing cage 234 is located between the inner race 231 and the outer race 232. In the exemplary embodiment, the rollable bodies 233 may be spherical in shape, for example, but not limited to, balls.

The inner race 231 defines an inner circumferential surface, and is provided on the outside of the rotatable part 210 (e.g. a ball nut of the ball-screw mechanism 200). The inner race 231 may be directly formed on, or fixed to, the outer surface of the rotatable part 210. For example, as illustrated in FIGS. 1, 3A and 3C, a portion of the outer surface of the rotatable part 210 defines the inner race 231. By utilizing the Conrad bearing assembly method to assemble the bearing assembly 230, the inner race 231 can be integrated with the rotatable part 210 as one single piece, thereby providing a simpler assembly process and reducing manufacturing cost. The outer race 232 defines an outer circumferential surface and is fixed to, or formed on, a non-rotating structure such as the housing 600 for example. However, the outer race 232 can be used at any desired location within the brake assembly 10.

The rollable bodies 233 may form one or more contact angles with respect to the inner race curved support surface 413 and the outer race curved support surface 423. For example, the bearing assembly 230 may provide a two- or four-point contact configuration. In an example of two-point contact per rollable body 233 configuration, one point of contact is formed on the inner race curved support surface 413 and the other point of contact is formed on the outer race curved support surface 423. In an example of four-point contact per rollable body 233 configuration, two points of contact are formed on the inner race curved support surface 413 and two other points of contact are formed on the outer race curved support surface 423.

The inner race 231 has a first inner shoulder 411, a second inner shoulder 412, and the inner race curved support surface 413 between the first inner shoulder 411 and the second inner shoulder 412. The pair of the inner shoulders 411, 412 are on a respective side of the inner race curved support surface 413. The first inner shoulder 411 and the second inner shoulder 412 of the inner race 231 can prevent the rollable bodies 233 from exiting the inner race curved support surface 413 to retain the rollable bodies 233 within the bearing assembly 230. The inner race curved support surface 413 may comprise at least two spherical surfaces having different curvatures each having a center of curvature that is offset from the center of the rollable body 233 and mutually non-coincident to form one or more contact points such as one or two contact points on the inner race curved support surface 413.

The first inner shoulder 411 and the second inner shoulder 412 of the inner race 231 may be asymmetric to each other with respect to the rollable bodies 233 disposed between the first inner shoulder 411 and the second inner shoulder 412. For instance, the outer diameter of the first inner shoulder 411 of the inner race 231 may be different from the outer diameter of the second inner shoulder 412 of the inner race 231. The first inner shoulder 411 of the inner race 231 may be more outwardly protruded than the second inner shoulder 412 of the inner race 231. In other words, the height 441 of the first inner shoulder 411 of the inner race 231 may be higher than the height 442 of the second inner shoulder 412 of the inner race 231. Alternatively, the first inner shoulder 411 of the inner race 231 may be less outwardly protruded than the second inner shoulder 412 of the inner race 231.

The outer race 232 has a first outer shoulder 421, a second outer shoulder 422, and the outer race curved support surface 423 between the first outer shoulder 421 and the second outer shoulder 422. The pair of the outer shoulders 421, 422 are on a respective side of the outer race curved support surface 423. The first outer shoulder 421 and the second outer shoulder 422 of the outer race 232 can prevent the rollable bodies 233 from exiting the outer race curved support surface 423 to retain the rollable bodies 233 within the bearing assembly 230. The outer race curved support surface 423 may comprise at least two curvature surfaces having different curvatures each having a center of curvature that is offset from the center of the rollable body 233 and mutually non-coincident to form one or more contact points such as one or two contact points on the outer race curved support surface 423.

The first outer shoulder 421 and the second outer shoulder 422 of the outer race 232 may be asymmetric to each other with respect to the rollable bodies 233 disposed between the first outer shoulder 421 and the second outer shoulder 422. For example, the inner diameter of the first outer shoulder 421 of the outer race 232 may be different from the inner diameter of the second outer shoulder 422 of the outer race 232. The second outer shoulder 422 of the outer race 232 may be less inwardly protruded than the first outer shoulder 421 of the outer race 232. In other words, the height 444 of the second outer shoulder 422 of the outer race 232 may be higher than the height 443 of the first outer shoulder 421 of the outer race 232. Alternatively, the first outer shoulder 421 of the outer race 232 may be more inwardly protruded than the second outer shoulder 422 of the outer race 232.

Figure 5A:
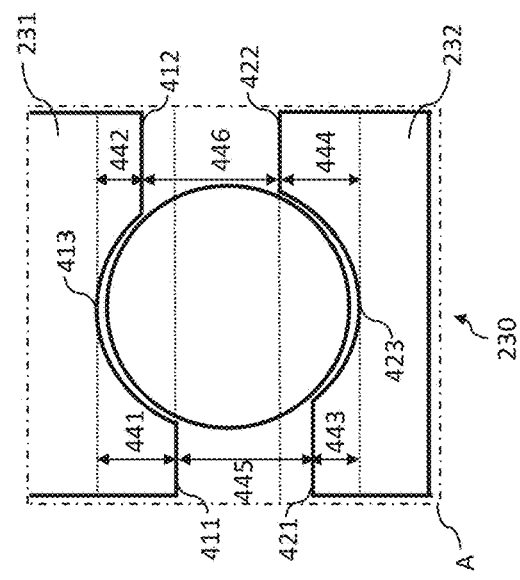
FIGS. 5A to 5C are enlarged views of a bearing assembly taken from a portion A in FIG. 1 according to various exemplary embodiments of the present disclosure.
Figure 5B:
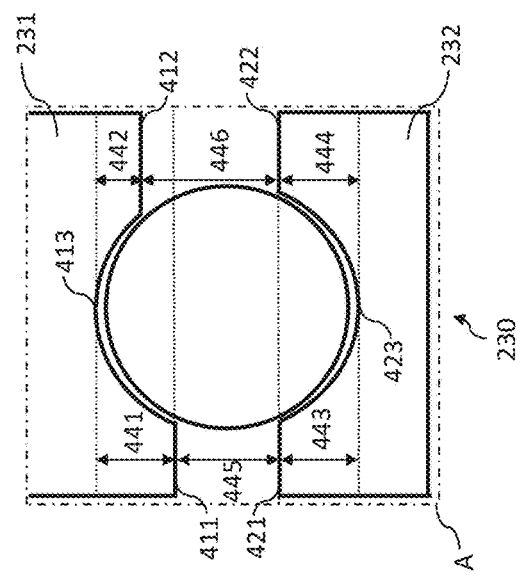
Figure 5C:
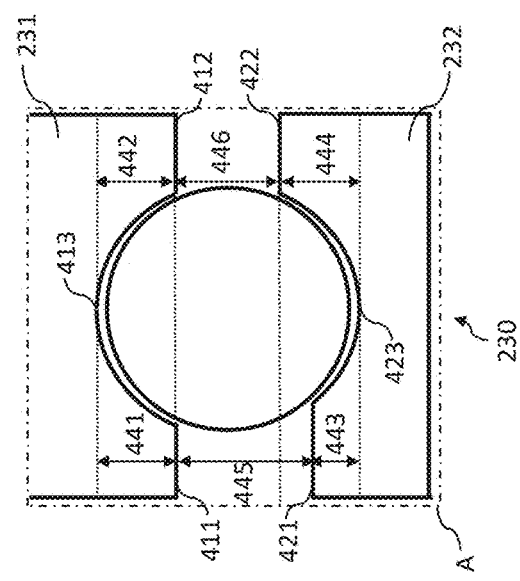

Accordingly, according to some exemplary embodiments of the present disclosure, the inner shoulders 411 and 412 of the inner race 231 and the outer shoulders 421 and 422 of the outer race 232 may be of varying heights. Various exemplary embodiments of the bearing assembly 230 having asymmetric shoulder heights are shown in greater details in FIGS. 5A to 5C. FIGS. 5A to 5C are enlarged views of the bearing assembly 230 taken from a portion A in FIG. 1 according to various exemplary embodiments of the present disclosure.

As illustrated in a first exemplary embodiment shown in FIG. 5A, both the inner race 231 and the outer race 232 may have asymmetric shoulders. For instance, the first inner shoulder 411 of the inner race 231 positioned to be closer to the brake pad assembly 120 than the second inner shoulder 412 of the inner race 231 is more outwardly protruded than the second inner shoulder 412 of the inner race 231 positioned to be farther from the brake pad assembly 120 than the first inner shoulder 411 of the inner race 231. And, the second outer shoulder 422 of the outer race 232 positioned to be farther from the brake pad assembly 120 than the first outer shoulder 421 of the outer race 232 is more inwardly protruded than the first outer shoulder 421 of the outer race 232 positioned to be closer to the brake pad assembly 120 than the second outer shoulder 422 of the outer race 232.

As shown in a second exemplary embodiment illustrated in FIG. 5B, the inner race 231 may have asymmetric shoulders, while the outer race 232 may have symmetric shoulders. For instance, like the first exemplary embodiment of the FIG. 5A, the first inner shoulder 411 of the inner race 231 positioned to be closer to the brake pad assembly 120 than the second inner shoulder 412 of the inner race 231 is more outwardly protruded than the second inner shoulder 412 of the inner race 231 positioned to be farther from the brake pad assembly 120 than the first inner shoulder 411 of the inner race 231. However, unlike the first exemplary embodiment of the FIG. 5A, the first outer shoulder 421 and the second outer shoulder 422 have the same inner diameter or height as each other.

As illustrated in a third exemplary embodiment illustrated in FIG. 5C, the outer race 232 may have asymmetric shoulders, but the inner race 231 may have symmetric shoulders. For examiner, like the first exemplary embodiment of the FIG. 5A, the second outer shoulder 422 of the outer race 232 positioned to be farther from the brake pad assembly 120 than the first outer shoulder 421 of the outer race 232 is more inwardly protruded than the first outer shoulder 421 of the outer race 232 positioned to be closer to the brake pad assembly 120 than the second outer shoulder 422 of the outer race 232. However, unlike the first exemplary embodiment of the FIG. 5A, the outer diameters or heights of the first inner shoulder 411 and the second inner shoulder 412 are equal to each other.

A distance 445 between the first inner shoulder 411 and the first outer shoulder 421 which are positioned to be closer to the brake pad assembly 120 than the second inner shoulder 412 and the second outer shoulder 422, respectively, may be greater than a radius of the rollable body 233. Additionally or alternatively, a distance 446 between the second inner shoulder 412 and the second outer shoulder 422 which are positioned to be farther from the brake pad assembly 120 than the first inner shoulder 411 and the first outer shoulder 421, respectively, may be greater than a radius of the rollable body 233. The distance 445 and/or 446 greater than the radius of the rollable body 233 allows using the Conrad bearing assembly process when the inner race 231 and the outer race 232 are radially offset.

Figure 6:
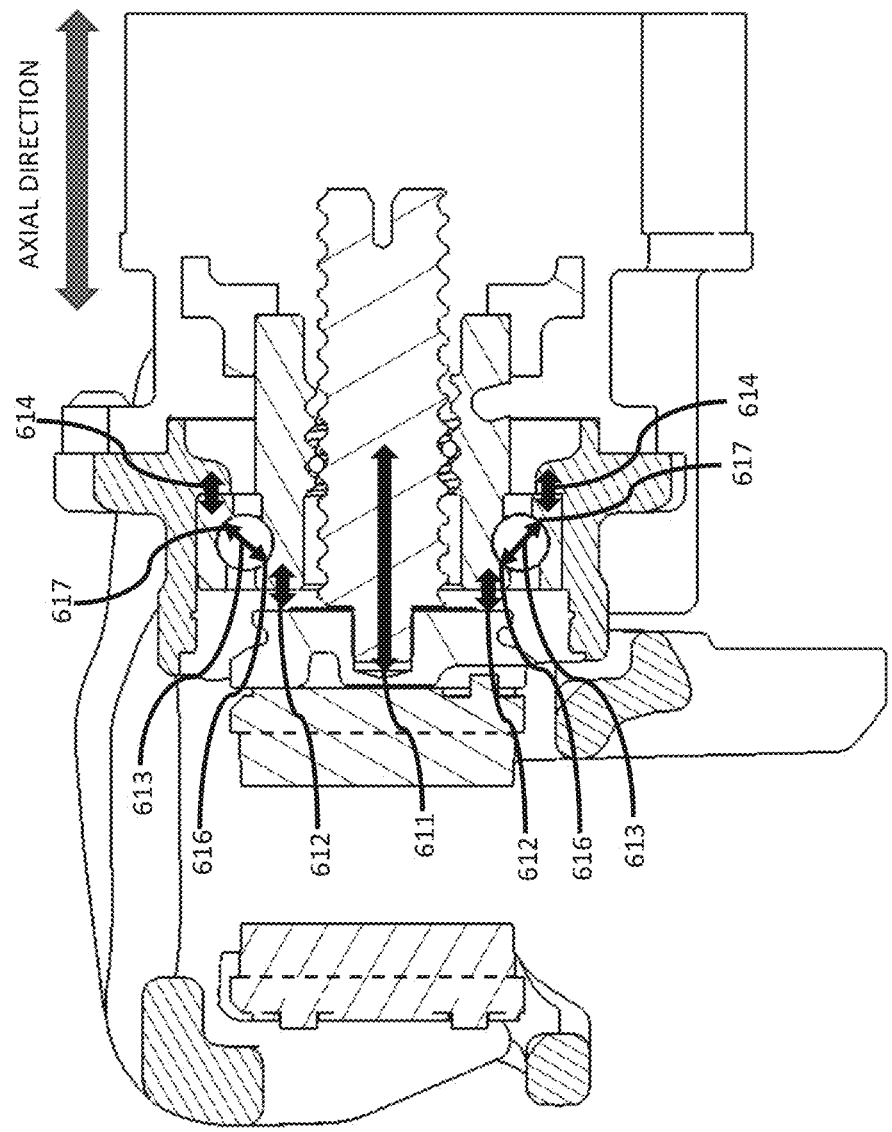
FIG. 6 shows a pure axial load path generated in a brake assembly during actuation of an actuator assembly according to an embodiment of the present disclosure.
Figure 7:
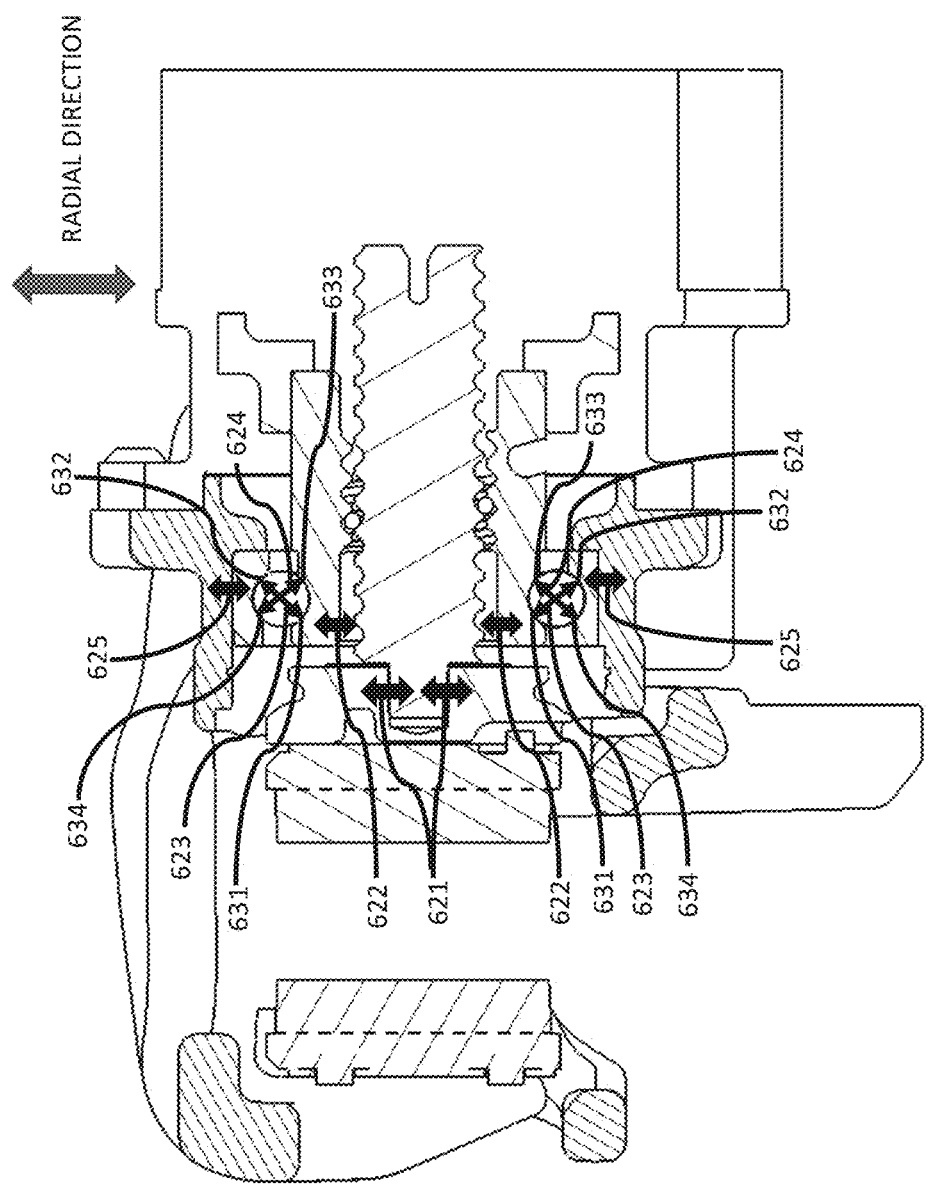
FIG. 7 illustrates a pure radial load path generated in a brake assembly during actuation of an actuator assembly according to an embodiment of the present disclosure.

As illustrated in FIGS. 6 and 7, the bearing assembly 230 experience both an axial load and a radial load by the brake apply during the actuation of the actuator assembly 500. FIG. 6 shows a pure axial load path generated in the brake assembly 10 during the actuation of the actuator assembly 500, and FIG. 7 illustrates a pure radial load path generated in the brake assembly 10 during the actuation of the actuator assembly 500 according to an embodiment of the present disclosure.

In FIG. 6 showing the pure axial load path in the brake assembly 10 having the bearing assembly 230 with asymmetrical shoulders according to an embodiment of the present disclosure, the actuation of the actuator assembly 500 generates a compression load, represented as a first action arrow 611, on the translatable part 230 (e.g. a ball screw). The compression load on the translatable part 230 can be transmitted to the rotatable part 210 through the rollable bodies 261. A second action arrow 612 shows an axial load which is caused by a force transferred to the rotatable part 210 (e.g. a ball nut) via the rollable bodies 261 (e.g. internal ball nut/screw balls). Then, the force transferred to the rotatable part 210 acts on the bearing assembly 230. The force transferred through the bearing assembly 230 creates a load supporting line 613, thereby forming two contact points per rollable body 233 because the inner race 231 and the outer race 232 move in opposite axial directions relative to each other. One contact point 616 per rollable body 233 is formed on a portion of the inner race curved support surface 413 closer to the first inner shoulder 411 having a higher height or more outwardly protruding than the second inner shoulder 412, and another contact point 617 per rollable body 233 is formed on a portion of the outer race curved support surface 423 closer to the second outer shoulder 422 having a higher height or more inwardly protruding than the first outer shoulder 421. Accordingly, one contact point per rollable body 233 is formed at each of the inner race 231 and the outer race 232. The force on the bearing assembly 230 is transferred to a part of the housing 600. A third action arrow 614 illustrates a force transferred from the outer race 232 of the bearing assembly 230 to a part of the housing 600 (e.g. an EMB bridge) in an axial direction.

In FIG. 7 showing the pure radial load path in the brake assembly 10 having the bearing assembly 230 with asymmetrical shoulders according to an embodiment of the present disclosure, the actuation of the actuator assembly 500 places a relatively small radial load, represented as a first action arrow 621, on the translatable part 230 (e.g. a ball screw). The radial load on the translatable part 230 can be transmitted to the rotatable part 210 through the rollable bodies 261. A second action arrow 622 shows a radial load which is caused by a force transferred to the rotatable part 210 (e.g. a ball nut) via the rollable bodies 261 (e.g. internal ball nut/screw balls). Then, the force transferred to the rotatable part 210 acts on the bearing assembly 230. A force transferred through the bearing assembly 230 creates two load supporting lines 623, 624, thereby forming four contact points per rollable body 233 since the inner race 231 and the outer race 232 radially move toward each other. The first load supporting line 623 can form a first contact point 631 on a portion of the inner race curved support surface 413 closer to the first inner shoulder 411 having a higher height or more outwardly protruding than the second inner shoulder 412, and a second contact point 632 on a portion of the outer race curved support surface 423 closer to the second outer shoulder 422 having a higher height or more inwardly protruding than the first outer shoulder 421. The second load supporting line 624 can form a third contact point 633 on a portion of the inner race curved support surface 413 closer to the second inner shoulder 412 having a lower height or less outwardly protruding than the first inner shoulder 411, and a fourth contact point 634 on a portion of the outer race curved support surface 423 closer to the first outer shoulder 421 having a lower height or less inwardly protruding than the second outer shoulder 422. Therefore, two contact points are formed at each of the inner race 231 and the outer race 232 per rollable body 233. The force on the bearing assembly 230 is transferred to a part of the housing 600. A third action line 625 illustrates a force transferred from the outer race 232 of the bearing assembly 230 to a part of the housing 600 (e.g. an EMB bridge) in a radial direction.

Figure 8:
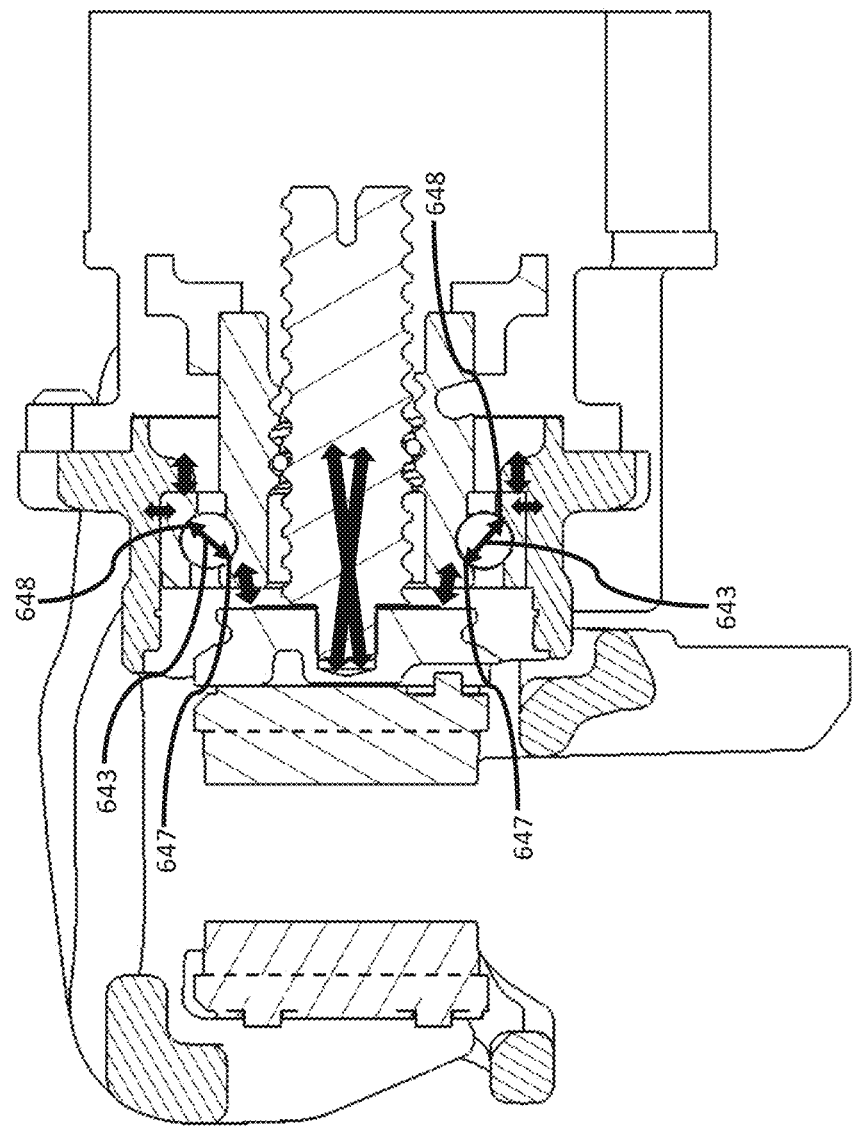
FIG. 8 shows a load path of combination of an axial load and a radial load generated in a brake assembly having a bearing assembly with asymmetrical shoulders according to an embodiment of the present disclosure.

FIG. 8 shows a load path of combination of an axial load and a radial load generated in the brake assembly 10 having the bearing assembly 230 with asymmetrical shoulders according to an embodiment of the present disclosure. As illustrated in FIGS. 6 and 7, a relatively large axial load vector is generated by the actuation of the actuator assembly 500 during the brake apply, while a radial load vector relatively much smaller than the axial load vector is generated. The brake caliper 110 deflection during a braking event may be the source of the radial load. The combination of the large axial load vector and the small radial load vector can create one load supporting line 643 forming two contact points 647, 648 per rollable body 233 in the bearing assembly 230. One contact point 647 of the combination load is formed on a portion of the inner race curved support surface 413 closer to the first inner shoulder 411 having a higher height or more outwardly protruding than the second inner shoulder 412 and another contact point 648 is formed on a portion of the outer race curved support surface 423 closer to the second outer shoulder 422 having a higher height or more inwardly protruding than the second outer shoulder 421. Accordingly, the first inner shoulder 411 having a higher height or more outwardly protruding than the second inner shoulder 412 and the second outer shoulder 422 having a higher height or more inwardly protruding than the second outer shoulder 421 can act as a high load-bearing shoulder on which loads are applied, while the second inner shoulder 412 having a lower height or less outwardly protruding than the first inner shoulder 411 and the first outer shoulder 421 having a lower height or less inwardly protruding than the second outer shoulder 422 can act as a non-load-bearing shoulder during a braking event. Only one contact point per rollable body 233 of each of the inner race 231 and outer race 232 endures high axial loads. Therefore, by having a higher shoulder at a side of each of the inner race 231 and/or the outer race 232 where a contact point per rollable body 233 is formed, the bearing assembly 230 according to exemplary embodiments of the present disclosure can endure the combination of the axial and radial loads effectively, and can enable high ball or raceway contact angles, resulting in higher axial unidirectional maximum load limit where the majority of the brake clamp force reacts. The inner race 231 and the outer race 232 having one higher shoulder than another shoulder can allow for a higher contact angle for high unidirectional axial loading. Further, the bearing assembly 230 having asymmetric shoulder heights may increase a maximum brake clamp force without increasing in a package size of the bearing assembly 230. Additionally, the bearing assembly 230 with asymmetric shoulder design can endure limited bidirectional axial load caused by a brake piston acceleration or brake system environment vibration. In addition, the opposite inner and outer race shoulder heights, where minimal axial and radial loads are endured, are set to allow for the Conrad bearing assembly method of the outer race 232 to the inner race 231 integrated with the screw mechanism 200.

Further, according to certain embodiments of the present disclosure, the bearing assembly 230 having asymmetrical shoulders of the inner race 231 and/or the outer race 232 may reduce the size of the bearing assembly 200 by retaining the Conrad assembly and eliminating the need for a split ring type bearing such that the first inner shoulder 411, the second inner shoulder 412, and the inner curved surface 413 are integrally formed with the rotatable part 210 of the screw mechanism 200 as a single piece, and/or the first outer shoulder 421, the second outer shoulder 422, and the outer curved surface 423 are integrally formed as a single piece, although not required.

Although the example embodiments have been described in detail, it should be understood that various changes, substitutions and alterations can be made herein without departing from the spirit and scope of the present disclosure as defined by the appended claims.

Moreover, the scope of the present application is not intended to be limited to the particular embodiments of the process, machine, manufacture, and composition of matter, means, methods and steps described in the specification. As one of ordinary skill in the art will readily appreciate from the disclosure, processes, machines, manufacture, compositions of matter, means, methods or steps, presently existing or later to be developed, that perform substantially the same function or achieve substantially the same result as the corresponding embodiments described herein may be utilized according to the embodiments and alternative embodiments. Accordingly, the appended claims are intended to include within their scope such processes, machines, manufacture, compositions of matter, means, methods, or steps.

The explanations and illustrations presented herein are intended to acquaint others skilled in the art with the invention, its principles, and its practical application. The above description is intended to be illustrative and not restrictive. Those skilled in the art may adapt and apply the invention in its numerous forms, as may be best suited to the requirements of a particular use.

Accordingly, the specific embodiments of the present invention as set forth are not intended as being exhaustive or limiting of the teachings. The scope of the teachings should, therefore, be determined not with reference to this description, but should instead be determined with reference to the appended claims, along with the full scope of equivalents to which such claims are entitled. The omission in the following claims of any aspect of subject matter that is disclosed herein is not a disclaimer of such subject matter, nor should it be regarded that the inventors did not consider such subject matter to be part of the disclosed inventive subject matter.

Plural elements or steps can be provided by a single integrated element or step. Alternatively, a single element or step might be divided into separate plural elements or steps.

The disclosure of "a" or "one" to describe an element or step is not intended to foreclose additional elements or steps.

While the terms first, second, third, etc., may be used herein to describe various elements, components, regions, layers and/or sections, these elements, components, regions, layers and/or sections should not be limited by these terms. These terms may be used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A brake assembly comprising:
a rotatable part configured to be rotatable by an actuator;
a translatable part operably coupled with the rotatable part, the translatable part configured to be axially translatable relative to the rotatable part to move a brake pad according to rotation of the rotatable part; and
a bearing assembly comprising:
an inner race provided on an outside of the rotatable part, the inner race having a first inner shoulder, a second inner shoulder, and an inner curved surface between the first inner shoulder and the second inner shoulder;
an outer race having a first outer shoulder, a second outer shoulder, and an outer curved surface between the first outer shoulder and the second outer shoulder; and
rollable bodies rollably disposed between the inner race and the outer race,
wherein the first inner shoulder of the inner race and/or the first outer shoulder of the outer race are asymmetric to the second inner shoulder of the inner race and/or the second outer shoulder of the outer race, respectively,
wherein:
the first inner shoulder of the inner race positioned to be closer to the brake pad than the second inner shoulder of the inner race is more outwardly protruded than the second inner shoulder of the inner race positioned to be farther from the brake pad than the first inner shoulder of the inner race, and the first outer shoulder and the second outer shoulder of the outer race are protruded at a same height as each other.

2. A brake assembly comprising:

a rotatable part configured to be rotatable by an actuator;

a translatable part operably coupled with the rotatable part, the translatable part configured to be axially translatable relative to the rotatable part to move a brake pad according to rotation of the rotatable part; and a bearing assembly comprising:

an inner race provided on an outside of the rotatable part, the inner race having a first inner shoulder, a second inner shoulder, and an inner curved surface between the first inner shoulder and the second inner shoulder;

an outer race having a first outer shoulder, a second outer shoulder, and an outer curved surface between the first outer shoulder and the second outer shoulder; and rollable bodies rollably disposed between the inner race and the outer race, wherein the first inner shoulder of the inner race and/or the first outer shoulder of the outer race are asymmetric to the second inner shoulder of the inner race and/or the second outer shoulder of the outer race, respectively, wherein:

the first inner shoulder and the second inner shoulder of the inner race are protruded at a same height as each other, and the second outer shoulder of the outer race positioned to be farther from the brake pad than the first outer shoulder of the outer race is more inwardly protruded than the first outer shoulder of the outer race positioned to be closer to the brake pad than the second outer shoulder of the outer shoulder.

3. The brake assembly of claim 1, wherein a distance between the first inner shoulder and the first outer shoulder of the bearing assembly which are positioned to be closer to the brake pad than the second inner shoulder and the second outer shoulder of the bearing assembly, respectively, is greater than a radius of one of the rollable bodies disposed between the inner race and the outer race of the bearing assembly.

4. The brake assembly of claim 1, wherein a distance between the second inner shoulder and the second outer shoulder of the bearing assembly which are positioned to be farther from the brake pad than the first inner shoulder and the first outer shoulder of the bearing assembly, respectively, is greater than a radius of one of the rollable bodies disposed between the inner race and the outer race of the bearing assembly.

5. The brake assembly of claim 1, wherein:

a distance between the first inner shoulder and the first outer shoulder of the bearing assembly which are positioned to be closer to the brake pad than the second inner shoulder and the second outer shoulder of the bearing assembly, respectively, is greater than a radius of one of the rollable bodies disposed between the inner race and the outer race of the bearing assembly, and a distance between the second inner shoulder and the second outer shoulder of the bearing assembly which are positioned to be farther from the brake pad than the first inner shoulder and the first outer shoulder of the bearing assembly, respectively, is greater than the radius of one of the rollable bodies disposed between the inner race and the outer race of the bearing assembly.

6. The brake assembly of claim 1, wherein the inner race of the bearing assembly is integrally formed on the outside of the rotatable part operatable connected with the translatable part.

7. The brake assembly of claim 1, wherein the first inner shoulder, the second inner shoulder, and the inner curved surface are integrally formed with the rotatable part as a single piece.

8. The brake assembly of claim 1, wherein the first outer shoulder, the second outer shoulder, and the outer curved surface are integrally formed as a single piece.

9. The brake assembly of claim 1, further comprising other rollable bodies disposed between the rotatable part and the translatable part.

* * * * *